(12) United States Patent
Cho

(10) Patent No.: US 8,327,397 B2
(45) Date of Patent: Dec. 4, 2012

(54) METHOD FOR PROVIDING INFORMATION DURING A CHANNEL CHANGE IN A DIGITAL BROADCAST RECEIVER

(75) Inventor: Nam Shin Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 927 days.

(21) Appl. No.: 11/271,253

(22) Filed: Nov. 10, 2005

(65) Prior Publication Data

US 2006/0101488 A1    May 11, 2006

(30) Foreign Application Priority Data

Nov. 10, 2004    (KR) ........................ 10-2004-0091545

(51) Int. Cl.
    *H04N 7/10*    (2006.01)
(52) U.S. Cl. ................ 725/32; 725/39; 725/40; 725/41; 725/42; 725/44
(58) Field of Classification Search ................... 725/32, 725/39, 40, 41, 42, 44
    See application file for complete search history.

(56) References Cited

U.S. PATENT DOCUMENTS

| | | | | |
|---|---|---|---|---|
| 5,253,066 A * | 10/1993 | Vogel | | 725/28 |
| 5,600,364 A * | 2/1997 | Hendricks et al. | | 725/9 |
| 5,893,091 A * | 4/1999 | Hunt et al. | | 707/3 |
| 5,907,321 A * | 5/1999 | Grossman et al. | | 725/32 |
| 6,384,869 B1 * | 5/2002 | Sciammarella et al. | | 348/564 |
| 6,490,001 B1 | 12/2002 | Shintani et al. | | |
| 6,701,526 B1 * | 3/2004 | Trovato | | 725/39 |
| 6,728,965 B1 * | 4/2004 | Mao | | 725/38 |
| 2002/0087973 A1 | 7/2002 | Hamilton et al. | | |
| 2002/0143627 A1 * | 10/2002 | Barsade et al. | | 705/14 |
| 2003/0028378 A1 * | 2/2003 | August et al. | | 704/260 |
| 2003/0084449 A1 | 5/2003 | Chane et al. | | |
| 2003/0188310 A1 * | 10/2003 | Klosterman et al. | | 725/42 |
| 2004/0003399 A1 | 1/2004 | Cooper | | |
| 2004/0012718 A1 | 1/2004 | Sullivan et al. | | |
| 2005/0080904 A1 * | 4/2005 | Green | | 709/227 |
| 2005/0083932 A1 * | 4/2005 | Lee et al. | | 370/390 |
| 2005/0174483 A1 * | 8/2005 | Ruckriem | | 348/387.1 |
| 2005/0174489 A1 * | 8/2005 | Yokoyama et al. | | 348/553 |
| 2007/0107014 A1 | 5/2007 | Howard et al. | | |

FOREIGN PATENT DOCUMENTS

| | | |
|---|---|---|
| JP | 2000508091 | 6/2000 |
| JP | 2001268470 | 9/2001 |
| JP | 2001339663 | 12/2001 |
| JP | 2002-051325 | 2/2002 |
| JP | 2002176599 | 6/2002 |
| JP | 2003-319275 | 7/2003 |
| KR | 1020000036690 A | 7/2000 |
| KR | 1020030061887 A | 7/2003 |
| RU | 2112325 | 5/1998 |
| RU | 2192103 | 10/2002 |
| WO | 2004021710 | 3/2004 |
| WO | 2004040554 | 5/2004 |

* cited by examiner

*Primary Examiner* — Pankaj Kumar
*Assistant Examiner* — Sahar Baig
(74) *Attorney, Agent, or Firm* — Lee, Hong, Degerman, Kang & Waimey

(57) ABSTRACT

A method for displaying video information in a digital broadcast receiver during a change from a current channel to a new channel is disclosed. The method is suitable for displaying video information such as an advertisement, information selected by the user, or a program guide.

19 Claims, 3 Drawing Sheets

METHOD FOR PROVIDING INFORMATION DURING A CHANNEL CHANGE IN A DIGITAL BROADCAST RECEIVER

CROSS-REFERENCE TO RELATED APPLICATIONS

Pursuant to 35 U.S.C. §119(a), this application claims the benefit of Korean Patent Application No. 10-2004-0091545, filed on Nov. 10, 2004, which is hereby incorporated by reference as if fully set forth herein.

FIELD OF THE INVENTION

The present invention relates to digital broadcasting, and more particularly, to a method for providing information during a channel change in a digital broadcast receiver which is capable of providing information during a delay caused by a channel change.

BACKGROUND OF THE INVENTION

In analog broadcasting, when changing to a new channel from a current channel, the video of the new channel is available immediately. In digital broadcasting, when changing to a new channel, output of video of the new channel is not immediately available; rather, there is a temporary delay before the video is available. A blank image is displayed during this delay until the video of the new channel is available. For this reason, viewers see a blank image while changing channels.

An interleaving scheme sometimes is used to enhance the reception rate in digital multimedia broadcasting (DMB) received by a moving receiver. In this case, the video delay caused by changing channels is longer due to the interleaving scheme.

If a digital broadcast receiver can simultaneously decode broadcasting signals of all broadcast channels, the video delay caused by changing channels can be prevented. However, practicality precludes manufacturing such a decoder.

Since such a video delay caused by changing channels results in viewer inconvenience, a scheme capable of eliminating the delay is desirable and needed.

SUMMARY OF THE INVENTION

Accordingly, the present invention is directed to a method for providing information during a channel change in a digital broadcast receiver overcoming one or more problems due to limitations and disadvantages of the related art.

An object of the present invention is to provide a method for providing and displaying information during a channel change in a digital broadcast receiver, wherein the information is an advertisement.

Another object of the present invention is to provide a method for providing and displaying information during a channel change in a digital broadcast receiver, wherein a user may select the information.

Another object of the present invention is to provide a method for providing and displaying information during a channel change in a digital broadcast receiver, wherein the information is at least one of an advertisement selected by the user, a program guide, and inherent user information.

Additional advantages, objects, and features of the invention are set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing and displaying information during a channel change in a digital broadcast receiver, which comprises the steps of: selecting information to be displayed during a channel change; obtaining display conditions of the information selected by the user; and displaying the substitute information in accordance with the display condition during the channel change.

The substitute information may be a momentary advertisement.

The substitute information may be a program guide. The program guide may be a program guide for the new channel, a program guide of a channel of the current channel, or a guide of programs recently viewed by the user.

The substitute information may be a function of the digital broadcast receiver determined by the user. The function selectable by the user may be a background image, tutorial information, or a schedule.

The method may further comprise the step of receiving the substitute information from a broadcasting service provider when the user selects the substitute information, and storing the received substitute information.

The method may further comprise the steps of specifying a duration of time for displaying the substitute information during the channel change, in accordance with a need of the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention associated with a method for displaying information during a channel change in a digital broadcast receiver, examples of which are illustrated in the accompanying drawings. Wherever possible, the same reference numbers will be used throughout the drawings to refer to the same or like parts.

In accordance with the present invention, the digital broadcast receiver displays at least one of an advertisement, a program guide, and inherent user information during a time taken for a video change caused by a channel change. In the following description, the advertisement, program guide, and inherent user information are referred to as "substitute information".

Here, the advertisement is a momentary advertisement displayed while a channel change takes place. The program guide is an electronic program guide (EPG) or interactive program guide (IPG) received through a redundant frequency band or provided from a separate external device. This program guide is displayed during the interval for a channel change from a current channel to a new channel. The inherent user information is information selected by the user from various functions supported by the digital broadcast receiver (e.g., background image), a tutorial function, and a user defined schedule. This inherent user information is displayed during a channel change interval.

Hereinafter, a configuration and operation of the digital broadcast receiver according to the present invention will be described in detail.

Figure 1:
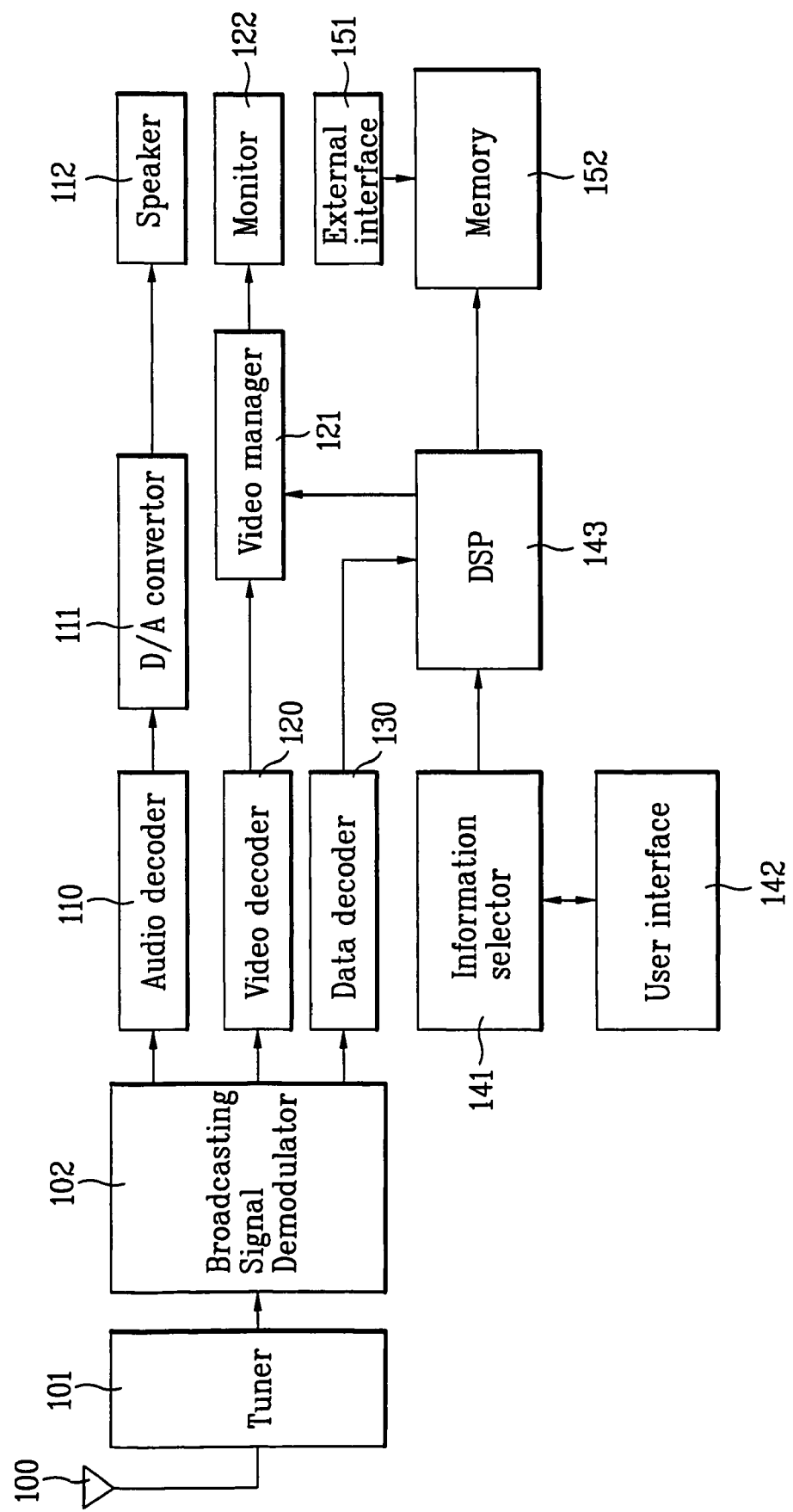
FIG. 1 shows a block diagram illustrating a configuration of a digital broadcast receiver according to the present invention.

FIG. 1 shows a block diagram illustrating the digital broadcast receiver according to the present invention, wherein a tuner 101 receives digital broadcast signals of diverse channels from an antenna 100, and tunes only the selected channel of the broadcast signals. The tuner 101 provides the tuned broadcast signal to a broadcast signal demodulator 102.

The broadcasting signal demodulator 102 demodulates the digital broadcast signal, thereby separating the digital broadcast signal into an audio signal, a video signal, and data outputs. An audio decoder 110 decodes the audio signal output. A video decoder 120 decodes the video signal output. A digital/analog (D/A) converter 111 converts the digital audio output to an analog signal, and the analog audio signal is provided to a speaker.

A video manager 121 converts the video decoder 120 output to an analog video signal having a format or size suitable for display. In some cases, the video manager 121 interleaves data input from a digital signal processor 143 (DSP) into the converted analog video signal. A monitor 122 externally displays the analog video signal from the video manager 121. The data includes the substitute information according to the present invention.

A data decoder 130 decodes the data output from the broadcasting signal demodulator 102. The DSP 143 stores an output from the data decoder 130 in a memory 152. In some cases, the DSP 143 provides the data received from the data decoder 130 to the video manager 121 allowing the video manager 121 to interleave the data into a video signal.

The output of the data decoder 130 includes EPG, IPG or a momentary advertisement.

An external interface 151 provides a path to connect the digital broadcast receiver to an on-line or off-line external device. Through the external interface 151, substitute information from the external device, such as an advertisement, program guide or inherent user information may be provided and stored in the memory 152.

A user interface 142 is also provided which may be a remote controller. Using the interface 142, a user can change channels, volume, and functions of the digital broadcast receiver. In particular, in accordance with the present invention, the user can select substitute information to be displayed during a channel change by operating the user interface 142.

An information selector 141 sends substitute information display information to the DSP 143. The DSP 143 stores the display information in the memory 152.

Hereinafter, operations of selecting substitute information in accordance with a user's desire and providing the selected substitute information will be described.

When the user requests selection of substitute information through the user interface 142, the DSP 143 provides a menu image of substitute information to the monitor 122.

The menu image contains the types of substitute information displayable during a channel change, namely, a program guide, a momentary advertisement, and inherent user information. When the user selects one of the three types of substitute information, a detailed menu relating to the selected type of substitute information is displayed on the monitor 122.

When the user completes selecting substitute information, the information selector 141 transmits final display information (hereinafter, simply referred to as "display information") to the DSP 143. The DSP 143 stores the display information in the memory 152.

If the user subsequently performs a channel change by operating the user interface 142, the substitute information selected by the user is displayed on the monitor 122 for a time necessary for a video change caused by the channel change. The substitute information is based on the information established by the user, namely, the display and selection information.

The procedure for selecting desired substitute information through the substitute information menu will be described for each type of substitute information.

When the user selects inherent user information as the substitute information, the DSP 143 provides various information items relating to the inherent user information for display on the monitor 122. Selected broadcast receiver functions such as a background image function, a tutorial function, or a user schedule may be displayed on a menu.

If the user selects the background image function, the digital broadcast receiver displays a plurality of background images, either still images or moving images. Such background images may be an image provided to the digital broadcast receiver through the external interface 151 from a system (broadcasting service provider) through a broadcasting signal, or captured from the output of the video manager 121 displayed through the monitor 122. The background images are stored in the memory 152.

The DSP 143 provides a list of the background images stored in the memory 152 together with information representing whether each of the listed background images is a moving image or a still image. When the user selects one of the listed background images, the DSP 143 displays setting information associated with the selected background image, wherein the setting information may be the resolution, size, format, and name of the selected background image. That is, the DSP 143 sets the background image selected by the user as an image to be displayed upon a channel change, and stores associated display information in the memory 152.

When the user selects the tutorial function, the digital broadcast receiver displays tutorial information, for example, a foreign language vocabulary or current event information, previously provided by the user. Words contained in a foreign language vocabulary or current event information may be provided through the external interface 151 or from the broadcasting service provider using a broadcasting signal. The tutorial information is stored in the memory 152.

The DSP 143 provides a menu having information associated with the foreign language vocabulary or current events stored in the memory 152. The information includes the output sequence of foreign language words (or current events), the font/font-size of characters, the number of words included in each display, etc. The DSP 143 stores the tutorial function display information in the memory 152.

When the user selects a schedule item from the information items, the DSP 143 provides a menu enabling creation of a new schedule or correction of a stored schedule. The display information includes the name, content, date, and time of an event, etc. The DSP 143 stores the user schedule in the memory 152.

Although the inherent user information has been described as including a background image function, a tutorial function, and a user schedule, the present invention is not limited thereto. The inherent user information may be changeable by the system designer or user.

When the user selects the program guide as the substitute information, the DSP 143 stores display information enabling display of a stored program guide during a channel change in the memory 152. In this case, it is preferred that the program guide be the latest program guide of the new channel. The detailed information of the program guide may include a program broadcasting time, a program title, an episode synopsis, characters, etc. The program guide may contain information relating to a program currently being broadcasted, or to be broadcasted in the future. The program guide may also be detailed information relating to a program broadcast before a channel change (for example, the time at which the user viewed the program, the episode synopsis of the program, the characters of the program, etc.). Also, the program guide may be detailed information of recently viewed programs (e.g., the viewing history of the programs of each channel). The above-described program guides are intended only for illustrative purposes without limiting the present invention thereto. The program guides may be changeable by the system designer or user.

When the user selects advertisements as substitute information, the DSP 143 stores display information enabling display of stored advertisements during a channel change in the memory 152. The DSP 143 also receives advertisements provided by the broadcasting service provider as the substitute information, and stores the received advertisements. The DSP 143 displays the stored advertisements during a channel change in a desired order. Of course, momentary advertisements may also be provided from an on-line or off-line external device.

Thus, when the user performs a channel change by operating the user interface 142, the DSP 143 reads the setting information designated by the user and associated substitute information from the memory 152. The DSP 143 then displays the substitute information based on the setting information through the monitor 122.

In detail, the DSP 143 displays the substitute information during the channel change until the video of the changed-to channel is ready for display.

In another embodiment of the present invention associated with display of substitute information, the substitute information selected by the user may be displayed at a time optionally set by the user (a time other than the channel change time) or for a period set by the user. That is, in accordance with the present invention, the digital broadcast receiver sets the substitute information display time or period in accordance with the needs of the user.

In another embodiment of the present invention, a user may change the time period for displaying the substitute information upon a channel change to a desired time period. If the substitute information display time is set to be more than a channel change period, the DSP 143 delays the completion of the channel change such that the channel change period corresponds to the set substitute information display time.

Hereinafter, the procedure for selecting the type of substitute information to be displayed during a channel change and the procedure for displaying the substitute information selected by the user will be described in conjunction with FIG. 2.

Figure 2:
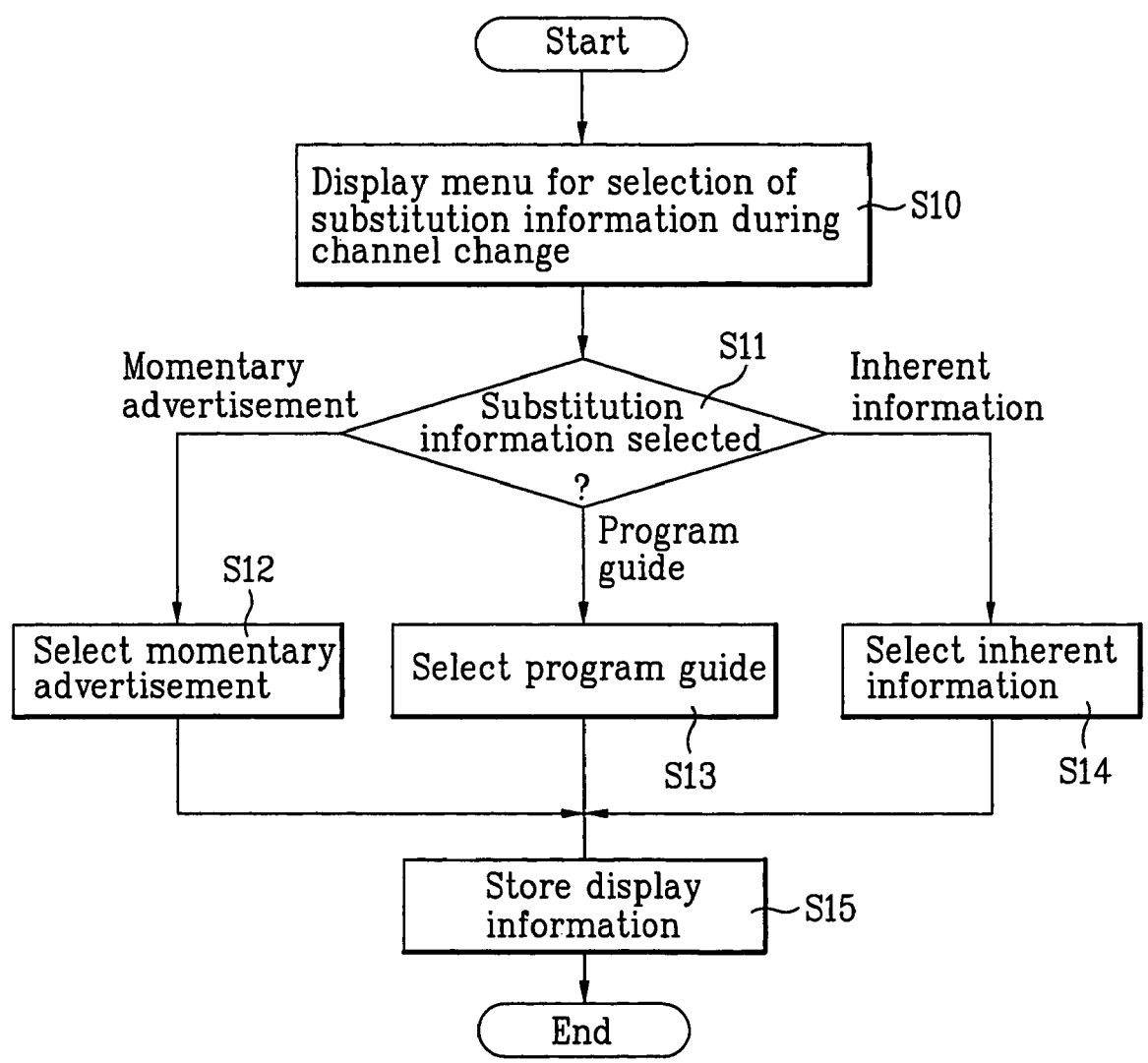
FIG. 2 shows a flow chart illustrating a procedure for selecting the type of substitute information to be displayed while changing channels in accordance with an embodiment of the present invention.

FIG. 2 shows a flow chart illustrating a procedure for selecting the type of substitute information to be displayed during a channel change in accordance with an embodiment of the present invention, wherein the user operates the user interface 142 to select substitute information to be displayed during a channel change, the DSP 143 executes menu for selecting substitute information (S10).

A menu image for selection of substitute information is displayed on the monitor 122. The menu image contains the types of substitute information displayable during a channel change, namely, a program guide, a momentary advertisement, and inherent user information. These types of substitute information are intended only for illustrative purposes without limiting the present invention thereto. In accordance with the present invention, the type of substitute information may be changeable by the menu designer or system designer.

When the user selects one type of substitute information to be displayed during a channel change using the menu (S11), the DSP 143 executes a detailed display information menu for the selected type of substitute information (S12, S13, or S14).

When the user finally determines a display condition for substitute information through the detailed display information menu, the DSP 143 stores display information associated with the final setting (S15).

Figure 3:
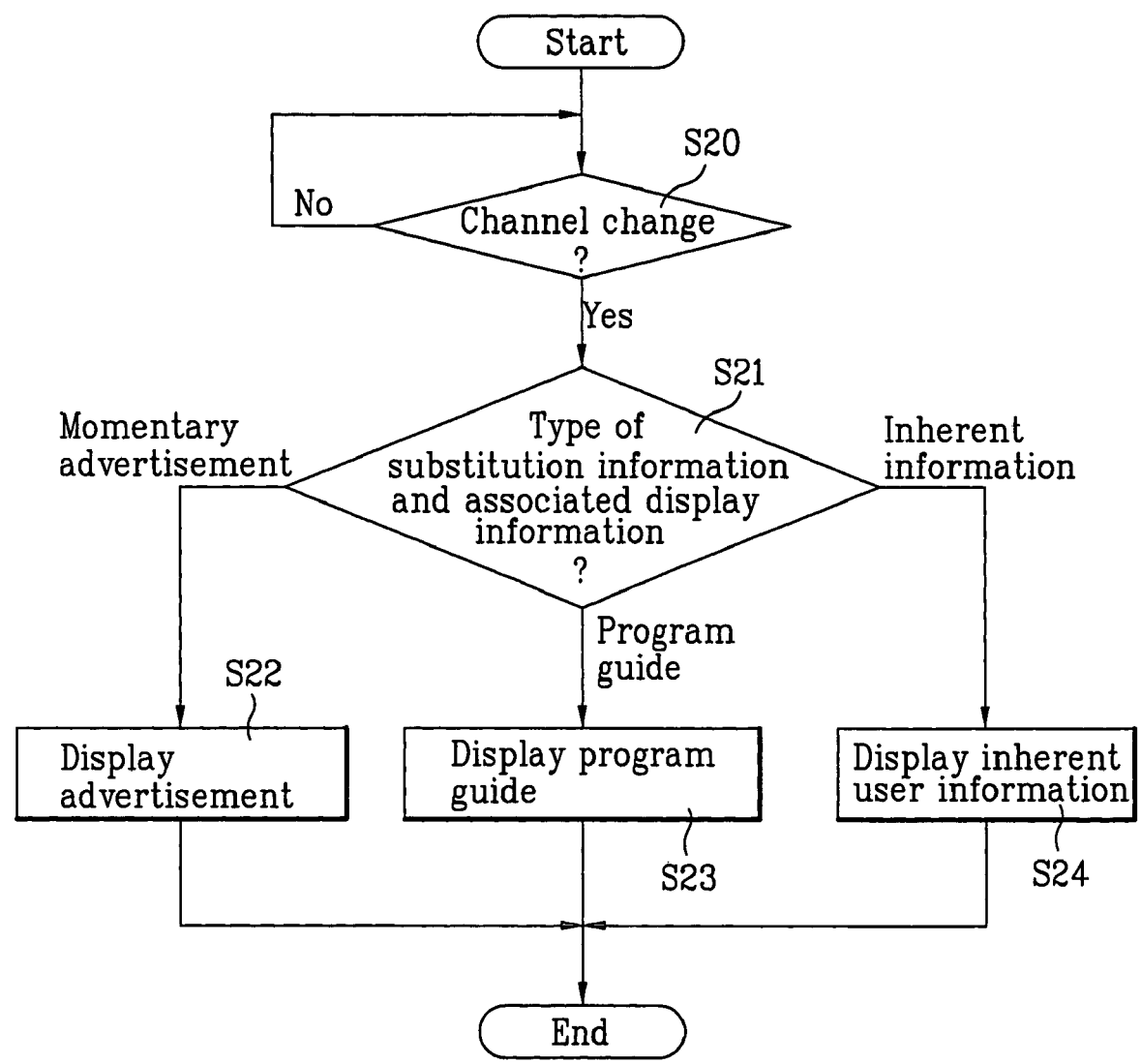
FIG. 3 shows a flow chart illustrating a procedure for providing and displaying substitute information selected by the user for display while changing channels in accordance with an embodiment of the present invention.

FIG. 3 is a flow chart illustrating a procedure for displaying substitute information selected by the user during a channel change in accordance with an embodiment of the present invention, wherein the user performs a channel change by operating the user interface 142 (S20), the DSP 143 searches for the substitute information selected by the user, and checks the display information associated with the selected substitute information (S21).

The DSP 143 then displays the substitute information selected by the user, based on the associated display information (S22, S23, or S24).

When a momentary advertisement as substitute information is selected, the DSP 143 displays one of currently stored advertisements (S22).

When a program guide as substitute information is selected, one of the following items is displayed in accordance with an EPG or IPG (S23):

1. Guide of latest programs of the new channel (broadcasting time, title, episode synopsis, characters, etc. of each program);
2. Guide of programs of the current channel (broadcasting time, title, episode synopsis, characters, etc. of each program);
3. Detailed information of recently viewed programs (viewing history for each channel); or
4. Guide of programs of all broadcasting channels The above-described program guides are intended only for illustrative purposes without limiting the present invention thereto. The program guides may be changeable by the system designer or user.

When inherent user information as substitute information is selected, the DSP 143 displays information items included in the inherent user information (S24). The information items may include the functions of the digital broadcast receiver (e.g., a background image function), a tutorial function, a user schedule, etc. Descriptions of each function have been presented above.

The terminology used herein includes terms defined by taking into consideration functions implemented in the present invention, and the definition thereof may be changed in accordance with the intention of skilled persons in the technical field or the custom in the technical field. Accordingly, the definition of the terminology must be determined based on the whole content of the present invention.

As apparent from the above description, it is possible to provide information or advertisements centered related to the user's interests during a channel change because the substitute information (an advertisement, a program guide, inherent user information, etc.) provided during the channel change is selected by the user.

In accordance with the present invention, the user is not inconvenienced because of a delay in displaying a video signal caused by a channel change. Substitute information selected by the user is displayed during this period.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying information in a digital broadcast receiver, the method comprising:
    selecting a type of information to be displayed during a channel change time period in response to user selection received at a user-interface of the receiver, wherein the selected type of information is any of a plurality of user-selectable information types, and wherein the plurality of user-selectable information types comprise a program guide information type, an advertisement information type, and a user information type;
    receiving a wireless digital broadcast signal comprising audio data, video data, and further data, wherein the further data comprises program guide data for the program guide information type and advertisement data for the advertisement information type;
    changing a displayed channel of a display of the digital broadcast receiver from a first channel to a second channel, wherein the displayed channel relates to the video data, and wherein a period of time from when the displayed channel is changed from the first channel to the second channel defines the channel change time period;
    when the selected type of information is the program guide information type, displaying on the display a program guide based upon the program guide data during at least a period of time of the channel change time period, wherein the displayed program guide comprises program identifier information identifying a plurality of programs recently displayed on the display, wherein the program identifier information is different from the video data; and
    when the selected type of information is the advertisement information type, displaying on the display an advertisement based on the advertisement data during at least a period of time of the channel change time period.

2. The method according to claim 1, further comprising:
    when the selected type of information is the user information type, displaying on the display a background image during at least a period of time of the channel change time period.

3. The method according to claim 2, wherein the displaying the background image further comprises:
    displaying a tutorial which represents data that varies based upon each occurrence of the changing of the displayed channel.

4. The method according to claim 3, wherein the tutorial comprises vocabulary words.

5. The method according to claim 4, wherein the tutorial comprises current events information.

6. The method according to claim 1, further comprising:
    displaying the program guide on the display for an additional period of time which does not occur during the channel change time period; and
    displaying the advertisement on the display for an additional period of time which does not occur during the channel change time period.

7. The method according to claim 1, further comprising:
    displaying the program guide on the display during at least a period of time after the displayed channel has been changed to the second channel; and
    displaying the advisement on the display during at least a period of time after the displayed channel has been changed to the second channel.

8. The method according to claim 1, wherein the program guide is a latest program guide.

9. A digital broadcast receiver, comprising:
    a demodulator configured to receive a wireless digital broadcast signal comprising audio data, video data, and further data, wherein the further data comprises program guide data for the program guide information type and advertisement data for the advertisement information type;
    a user interface;
    a display;
    a processor configured to:
        select a type of information to be displayed during a channel change time period in response to user selection received at the user-interface, wherein the selected type of information is any of a plurality of user-selectable information types, and wherein the plurality of user-selectable information types comprise a program guide information type, an advertisement information type, and a user information type;
        change a displayed channel of the display from a first channel to a second channel, wherein the displayed channel relates to the video data, and wherein a period of time from when the displayed channel is changed from the first channel to the second channel defines the channel change time period;
        when the selected type of information is the program guide information type, cause a program guide to be displayed on the display during at least a period of time of the channel change time period, wherein the displayed program guide is based upon the program guide data and comprises program identifier information identifying a plurality of programs recently displayed on the display, wherein the program identifier information is different from the video data; and
        when the selected type of information is the advertisement information type, cause an advertisement to be displayed on the display during at least a period of time of the channel change time period, wherein the displayed advertisement is based on the advertisement data.

10. The digital broadcast receiver according to claim 9, wherein the processor is further configured to:

when the selected type of information is the user information type, cause displaying on the display a background image during at least a period of time of the channel change time period.

11. The digital broadcast receiver according to claim 9, wherein the processor is further configured to:
cause a tutorial which represents data that varies based upon each occurrence of the changing of the displayed channel to be displayed on the display.

12. The digital broadcast receiver according to claim 11, wherein the tutorial comprises vocabulary words.

13. The digital broadcast receiver according to claim 11, wherein the tutorial comprises current events information.

14. The digital broadcast receiver according to claim 9, wherein the processor is further configured to:
cause the program guide to be displayed on the display for an additional period of time which does not occur during the channel change time period; and
cause the advertisement to be displayed on the display for an additional period of time which does not occur during the channel change time period.

15. The digital broadcast receiver according to claim 9, wherein the processor is further configured to:
cause the program guide to be displayed on the display during at least a period of time after the displayed channel has been changed to the second channel; and
cause the advertisement to be displayed on the display for at least a period of time which after the displayed channel has been changed to the second channel.

16. The digital broadcast receiver according to claim 9, wherein the program guide is a latest program guide.

17. A method for displaying information in a digital broadcast receiver, the method comprising:
selecting a type of information to be displayed during a channel change time period in response to user selection received at a user-interface of the receiver, wherein the selected type of information is any of a plurality of user-selectable information types, and wherein the plurality of user-selectable information types comprise a program guide information type, an advertisement information type, and a user information type;
receiving a wireless digital broadcast signal comprising audio data, video data, and further data, wherein the further data comprises the program guide data for the program guide information type and advertisement data for the advertisement information type;
changing a displayed channel of a display of the digital broadcast receiver from a first channel to a second channel, wherein the displayed channel relates to the video data;
when the selected type of information is the program guide information type, displaying on the display a program guide based upon the program guide data, the displaying of the program guide occurring only until the second channel is ready for display on the display, wherein the displayed program guide comprises program identifier information identifying a plurality of programs recently displayed on the display, wherein the program identifier information is different from the video data; and
when the selected type of information is the advertisement information type, displaying on the display an advertisement based on the advertisement data during at least a period of time of the channel change time period.

18. The method of claim 1, wherein the program identifier information identifying the plurality of programs recently displayed on the display comprises a history of the plurality of programs.

19. The method of claim 1, wherein the program guide further comprises a program title of each of a plurality of programs that are associated with the second channel, and wherein the program title of each of the plurality of programs is displayed during the at least a period of time of the channel change time period.

* * * * *